United States Patent [19]

Solomon

[11] 3,917,186

[45] Nov. 4, 1975

[54] MAGNETIC TAPE SPOOL

[75] Inventor: Nathan L. Solomon, New York, N.Y.

[73] Assignee: Solo Products Corporation, Englewood, N.J.

[22] Filed: Feb. 15, 1974

[21] Appl. No.: 443,086

[52] U.S. Cl. .......................... 242/71.8; 242/55.19 A

[51] Int. Cl.² .................... G11B 23/10; B65H 75/18

[58] Field of Search ..... 242/55.19 A, 55.19 R, 71.8, 242/118.1, 118.11, 129

[56] References Cited

UNITED STATES PATENTS

| | | | |
|---|---|---|---|
| 3,345,013 | 10/1967 | Nick | 242/71.8 |
| 3,617,010 | 11/1971 | Coy | 242/55.19 A |
| 3,753,533 | 8/1973 | Lyman | 242/55.19 A |
| 3,796,387 | 3/1974 | Zielke | 242/55.19 A |

FOREIGN PATENTS OR APPLICATIONS

| | | | |
|---|---|---|---|
| 864,756 | 4/1961 | United Kingdom | 242/55.19 A |

*Primary Examiner*—Billy S. Taylor
*Attorney, Agent, or Firm*—Howard C. Miskin

[57] ABSTRACT

A tape spool for an endless magnetic tape cassette is integrally formed of a polymeric resin and includes a pair of spaced inner and outer concentric circular base sections and angularly spaced spokes extending radially inwardly from the outer ring. Alternate spokes terminate in upwardly directed legs which join the outer face of a raised coaxial sleeve and the other spokes are foreshortened. Peripherally spaced resilient fingers project upwardly from the spokes and each includes an upwardly inwardly inclined lower section and an upwardly outwardly inclined upper section terminating in an upwardly directed leg joined to the outer face of a resilient flexible coaxial collar. The outer faces of the fingers and the top faces of the base rings are convex.

10 Claims, 5 Drawing Figures

MAGNETIC TAPE SPOOL

BACKGROUND OF THE INVENTION

The present invention relates generally to improvements in magnetic tape cassettes and cartridges, such as illustrated in U.S. Pat. No. 3,675,867 and it relates particularly to an improved spool for endless magnetic recording tape cassettes, such as used with a multitrack cartridge.

A conventional endless magnetic recording tape cassette is widespread use includes a casing which houses a spool having a hub and a single end flange, and an endless tape wound on the spool. A window is formed in the housing front face behind which is positioned a rubber pressure member on opposite sides of which are located a guide post and an idler roller. Tape is drawn from the inside of the tape coil wound on the spool, led around the guidepost, across the window, over the idler roller and back onto the outside of the coil of tape. The tape is advanced by a driven capstan engaging the tape and urged toward the idler roller.

An important component of the cassette of the above type is the spool, the satisfactory operation of the cassette depending on the proper construction of the spool. The conventional spool is a multicomponent structure which possesses numerous drawbacks and disadvantages. It is a relatively heavy and expensive device, costly to produce and assemble, and characterized by a lack of uniformity, and the frequent warping and distortion of the assembled spool. Cassette spools which are integrally formed as a unit have been heretofore proposed and while these represent an improvement over the conventional spool they are still wanting in many ways. The loading of the spool with the tape and the running of the endless tape are accompanied by difficulties which frequently result in tape abrasion, excessive stresses, and undue wastage in splicing the ends of the tape during assembling.

Accordingly, the operation of the conventional cassette and those heretofore proposed is unreliable and the recording and sound reproduction with such a cassette is often distorted and of low fidelity and the cassette otherwise leaves much to be desired.

SUMMARY OF THE INVENTION

It is a principal object of the present invention to provide an improved magnetic tape cassette or cartridge.

Another object of the present invention is to provide an improved spool for a magnetic recording tape cartridge of the endless tape type.

Still another object of the present invention is to provide an improved endless magnetic recording tape spool which is an integrally formed unit and is easy to load with tape and uniformly operates with minimum abrasion and stress to the tape and with the obviation of any damage thereto.

Still a further object of the present invention is to provide an improved spool of the above nature characterized by its low cost high reliability, minimum interference with high fidelity reproduction and great versatility and adaptability.

The above and other objects of the present invention will become apparent from a reading of the following description taken in conjunction with the accompanying drawings which illustrate a preferred embodiment thereof.

In a sense the present invention contemplates the provision in a magnetic recording tape cassette of the endless tape type of a tape spool comprising a circular base member, a coaxial inner sleeve mounted on the base and a plurality of resilient fingers projecting upwardly from the base and peripherally spaced about the axis of the base inwardly of the base outer edge, the fingers being outwardly concave.

In the preferred form of the spool the base includes a pair of concentric rings with upwardly convex faces and angularly spaced spokes extending radially from the outer base ring, alternate of the spokes terminating in upwardly directed legs joined to the outside face of the sleeve which is disposed above the plane of the base and the other spokes being foreshortened and terminating at the fingers. Each finger includes an inwardly upwardly inclined bottom section joined to a spoke and an outwardly upwardly inclined section terminating in an upwardly directed vertical leg. The finger vertical legs are joined to the outside face of a resilient collar. The spool is advantageously an integral unit formed of a polymeric resin.

The improved spool may be rapidly and easily loaded with an endless magnetic recording tape and in use imparts a minimum of stress and abrasion to the tape resulting in operation of maximum fidelity and minimum distortion and tape wear consequent to the handling of the tape by the spool. The spool is inexpensive and simple to uniformly fabricate and is of great versatility and adaptability.

DESCRIPTION OF THE PREFERRED EMBODIMENTS

Figure 1:
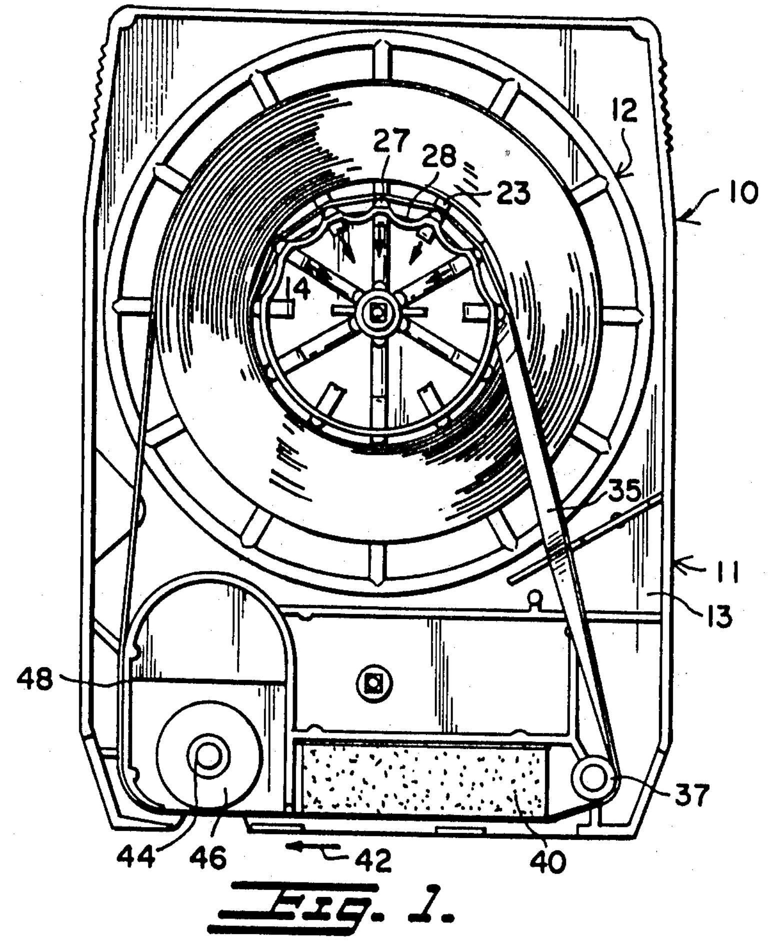
FIG. 1 is a top plan view of an endless tape cassette employing a spool embodying the present invention, with the top wall of the cassette removed.
Figure 2:
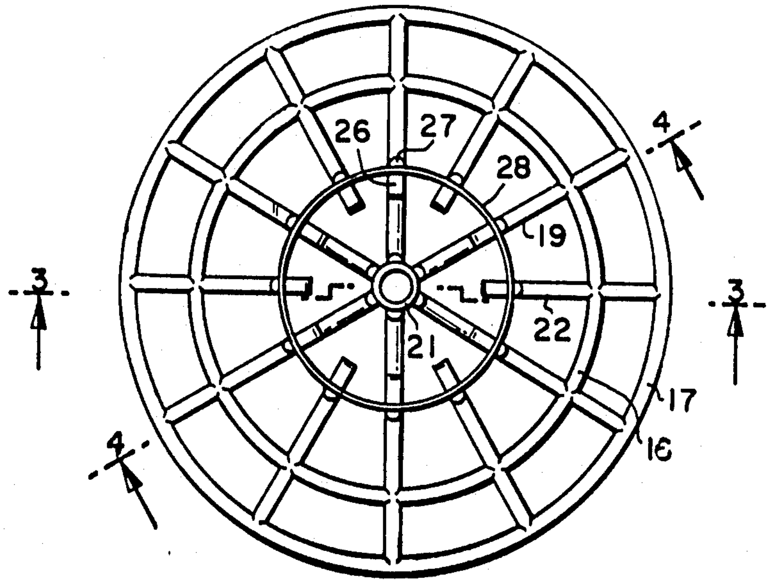
FIG. 2 is a top plan view of the spool.

Referring now to the drawing which illustrates a preferred embodiment of the present invention, the reference numeral 10 generally designates an endless magnetic tape cartridge or cassette, which includes a casing 11 and a single spool 12 constructed in accordance with the present invention. Casing 11 may be of conventional two part construction and formed of any suitable synthetic organic polymeric resin, and includes a bottom wall 13 provided with an upwardly directed axle or post 14 which supports spool 12 housed within casing 11. Casing 11 is provided with the usual tape guides, tape window, with resilient tape backing member, idler roller backing the tape proximate the window, and the other structural features normally associated with an endless tape cassette. As illustrated in FIG. 1, spool 12 is shown substantially full of tape 35, threaded as shown around guide member 37, past the tape window where it passes across a pressure pad 40, which is arranged to hold the tape against an electromagnetic transducer (not shown) for receiving from or recording on the tape electromagnetic signals. The tape 35 is pushed in the direction of arrow 42 by a drive capstan or roller (not shown) associated with the tape deck on which cassette 10 is used. A shaft 44 extends from bottom 13 and rotatably supports a spindle or roller 46. Tape 35 continues about a guide 48 and back onto the outer perimeter of tape wound on spool 12.

The spool 12 is an integrally formed unit which is advantageously produced by injection molding procedures from a suitable synthetic organic polymeric resin, for example, a high impact polystyrene resin or an acetal resin such as Delrin or Alcin, a suitable polyolefin such as polypropylene, polyethylene or the like. The spool 12 includes a substantially flat circular base 14 including a pair of radially spaced inner and outer concentric rings 16 and 17 respectively, the top faces of the rings being convexly curved and their bottom faces being flat and coplanar.

A first set of regularly angularly spaced spokes 19, illustrated as six in number, extend radially inwardly from the outer ring 17 to points short of the axis of rings 16 and 17 and terminate at their inner ends in upwardly directed vertical legs 20. The spokes 19 are flat, their underfaces being coplanar with those of rings 16 and 17 and their top faces being below that of the rings and the spokes 19 and rings 16 and 17 are integrally formed. The legs 20 are relatively heavy and their upper sections are integrally formed with the outside face of a sleeve 21 which is disposed above and is coaxial with rings 16 and 17.

A second set of regularly angularly spaced spokes 22 interdigitate the spokes 19 and extend radially inwardly from the outer ring 17 to points short of the inner ends of the spokes 19. The spokes 22 are similar in transverse cross section and disposition to spokes 19 and are integrally formed with rings 16 and 17.

Projecting upwardly from the inner end of each spoke 22 and from each spoke 19 intermediate the ends thereof are a corresponding plurality of upwardly directed hub defining resilient fingers which are arranged coaxially with the sleeve 21 and base 14 and are integrally formed with the respective spokes. The fingers 23 are similar and outwardly concave, each including an upwardly inwardly inclined lower section 24 joined at its upper end to the lower end of an upwardly outwardly inclined upper section 26. The finger upper sections terminate in relatively short upwardly directed vertical legs 27 which lie in a cylindrical plane coaxial with the sleeve 21.

In order to enhance the resiliency of the fingers 23 there is advantageously provided a flexible resilient collar 28 coaxial with and above the level of the sleeve 21 and integrally joined with and of substantially the same height as the inside faces of the finger legs 27. The outside faces of the fingers 23 are of curved convex configuration.

Figure 3:
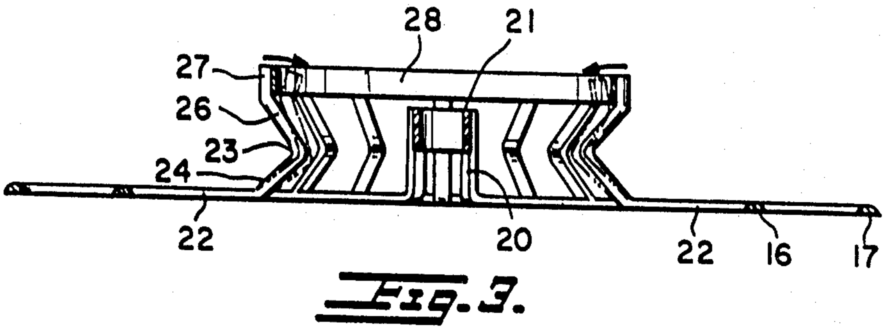
FIG. 3 is a sectional view taken along line 3—3 in FIG. 2.
Figure 4:
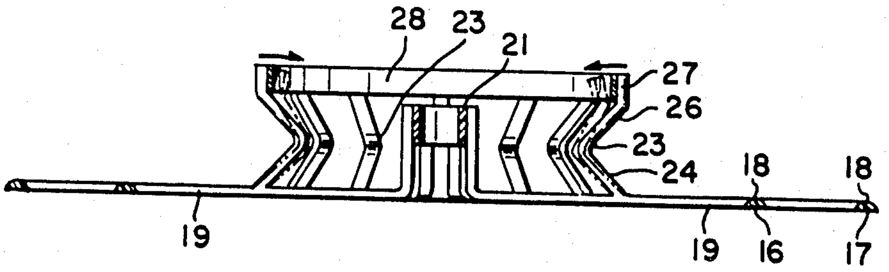
FIG. 4 is a sectional view taken along line 4—4 in FIG. 2.
Figure 5:
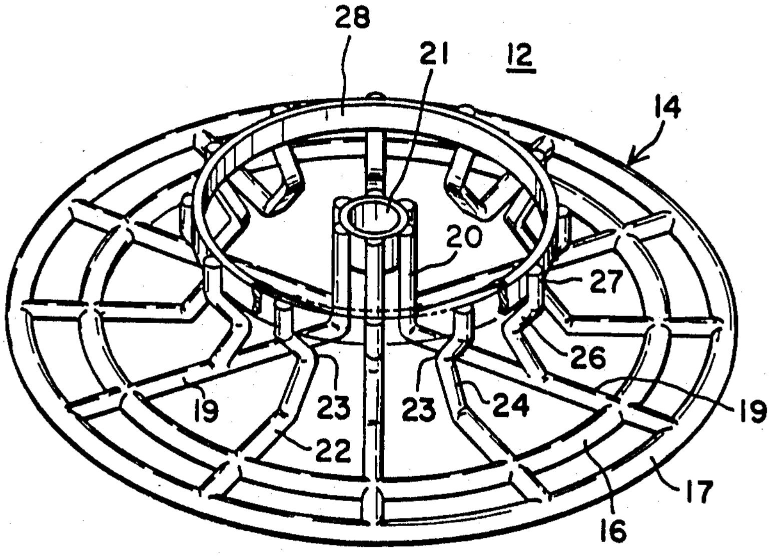
FIG. 5 is a front perspective view, partially fragmented, of the spool.

In the normal unstressed condition of the spool hub, the collar 28 is cylindrical and coaxial with the sleeve 21 and the fingers 23 are circularly arranged. However, when a stress is applied to a finger 23 in which the stress has an inwardly directed component, the respective finger will flex inwardly, as shown in FIG. 1 and by broken line in FIGS. 3 and 4. However, immediately upon release of such stress the respective finger 23 and the corresponding portions of the collar 28 resiliently return to their normal position. Thus, in operation, as the tape 25 is withdrawn from the inside of the wound storage thereof in the spool 12, in the known manner, and the portion of the hub defined by the fingers 23 flexes, as seen in the upper section of the spool illustrated in FIG. 1, to regulate the stress imparted to the tape as it is withdrawn from the spool and facilitate the uniform low stress withdrawal of the tape. As the spool rotates consequent to the withdrawal of the tape, successive portions of the hub as it advances to the tape withdrawing area deflect inwardly and upon leaving the tape withdrawal area, return to their normal state.

While there has been described and illustrated a preferred embodiment of the present invention, it is apparent that numerous alterations, omissions and additions may be made without departing from the spirit thereof.

What is claimed is:

1. An endless magnetic tape cassette spool comprising a circular base, an inner sleeve mounted on and coaxial with said base, a plurality of resilient fingers projecting upwardly from said base and peripherally spaced about the axis of said base inwardly of the peripheral edge thereof and being outwardly concave, and a resilient collar extending between and joined to the upper inner faces of said fingers.

2. The cassette spool of claim 1 wherein each of said fingers includes an inwardly upwardly inclined lower section and an outwardly upwardly inclined upper section joining said lower section and terminating in an upwardly directed leg.

3. The cassette spool of claim 1 wherein the outer faces of said fingers are curved convex surfaces.

4. The cassette spool of claim 1 wherein said base comprises an outer ring section and angularly spaced spokes extending radially inwardly from said outer ring section, said fingers being mounted on said spokes.

5. The cassette spool of claim 1 wherein said base comprises an outer ring section and angularly spaced spokes extending radially inwardly from said outer ring section, said fingers being mounted on said spokes and each of said fingers including an inwardly upwardly inclined lower section and an outwardly upwardly inclined upper section joining said lower section and terminating in an upwardly directed leg.

6. An endless magnetic tape cassette spool comprising a circular base having an outer ring section and angularly spaced spokes extending radially inwardly from said outer ring section, an inner sleeve mounted on and coaxial with said base, and a plurality of resilient fingers projecting upwardly from said base and peripherally spaced about the axis of said base inwardly of the peripheral edge thereof and being outwardly concave, said fingers being mounted on said spokes, each of said fingers including an inwardly upwardly inclined lower section and an outwardly upwardly inclined upper section joining said lower section and terminating in an upwardly directed leg, said sleeve being located above the plane of said base, and alternate of said spokes terminating at their inner ends in upwardly directed legs joining the outer face of said sleeve and the other spokes terminating at respective fingers.

7. The cassette spool of claim 6 wherein the upper face of said base outer ring and the outer faces of said fingers are convex.

8. The cassette spool of claim 6 formed as an integral unit of a synthetic organic polymeric resin.

9. A one piece plastic spool for supporting a coil of endless magnetic tape for use in a magnetic tape cartridge comprising a circular base having an outer ring section and a first and second sets of angularly spaced spokes extending radially inwardly from said outer ring section, said ring and spokes supporting the lower edges of said tape coil, said first set of spokes terminating at their inner ends in upwardly directed vertical legs defining an inner sleeve disposed above and coaxial to said base, said second set of spokes interdigitating the first set of spokes and terminating at their inner ends at points between said ring and the inner sleeve, a plurality of resilient fingers projecting upwardly from the inner ends of the second set of spokes and defining a hub coaxial with said inner sleeve, the upper faces of said spokes being convex shaped, said fingers including an inwardly and upwardly inclined lower section and an outwardly upwardly inclined upper section joining said lower section and terminating in an upwardly directed leg.

10. A spool in accordance with claim 9 in which fingers project upwardly from said first set of spokes and are within the loci of the hub.

* * * * *

UNITED STATES PATENT OFFICE
CERTIFICATE OF CORRECTION

PATENT NO. : 3,917,186

DATED : November 4, 1975.

INVENTOR(S) : Nathan L. Solomon

Figures 6, 7, 8:
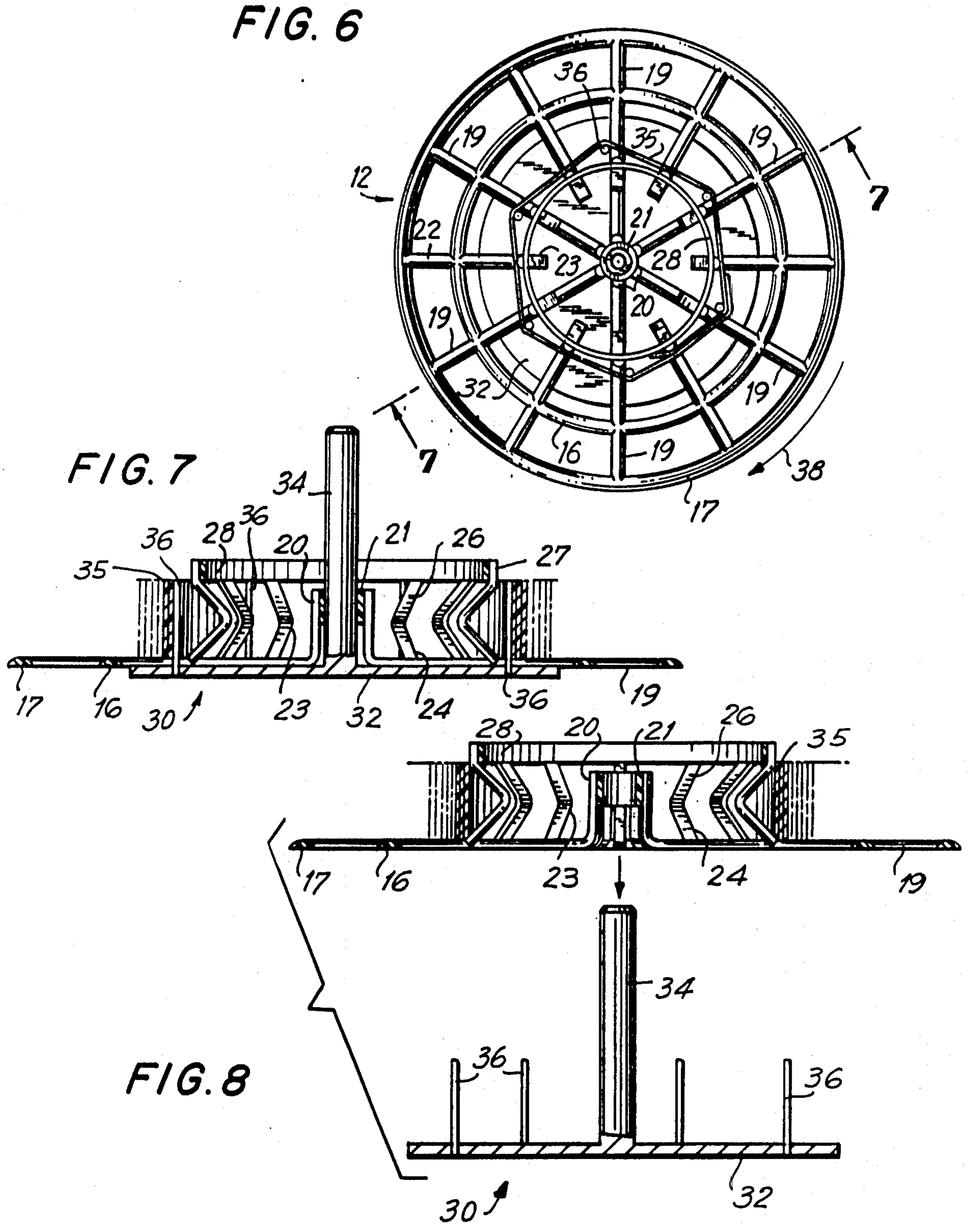

It is certified that error appears in the above-identified patent and that said Letters Patent are hereby corrected as shown below:

Delete sheet of drawings containing Figs. 6-8.

Signed and Sealed this

*eleventh* Day of *May 1976*

[SEAL]

*Attest:*

RUTH C. MASON
*Attesting Officer*

C. MARSHALL DANN
*Commissioner of Patents and Trademarks*